United States Patent
Nepela

[11] 3,724,938
[45] Apr. 3, 1973

[54] VARIABLE CONTRAST IMAGE PROJECTION

[76] Inventor: Daniel A. Nepela, 18960 Fernbrook Court, Saratoga, Calif.

[22] Filed: Nov. 28, 1969

[21] Appl. No.: 880,774

[52] U.S. Cl. .................353/20, 350/13, 350/157, 353/122
[51] Int. Cl. .....G03b 21/14, G02b 21/14, G02b 1/24
[58] Field of Search ..........350/157, 13; 353/20, 122

[56] References Cited

UNITED STATES PATENTS

| | | | |
|---|---|---|---|
| 2,924,142 | 2/1960 | Nomarski | 350/13 |
| 3,317,317 | 5/1967 | Clark | 355/17 |
| 3,409,438 | 11/1968 | Lokken | 96/95 |
| 3,431,044 | 3/1969 | Clark | 350/157 |
| 3,503,667 | 3/1970 | Tiedeman | 350/157 |

Primary Examiner—Leonard Forman
Assistant Examiner—Steven L. Stephan
Attorney—Fraser and Bogucki

[57] ABSTRACT

A system for controlling the contrast of projected images includes a polarizer, phase plate, analyzer, and image matrix comprising an exposed and developed photographic film defining an original image having light and dark portions. A beam of polarized light of a selected frequency is directed through the system and onto a screen. The polarizer, phase plate, and analyzer are adjustable to vary the contrast of the projected image through partial or complete extinction, by destructive interference, only of light passing to the projected image from the unexposed portions of the film. For light of a given intensity incident upon the film, the contrast, i.e., the pattern of light intensities, in the projected image, is different from that of the original image. This occurs because the intensity of light in the projected image passing thereto from the unexposed film portions is diminished through at least partial extinction. The background dark level, however, of the original image defined by the intensity of light passing from the exposed matrix portions is substantially unchanged in the projected image, relatively little extinction of such light occurring. Contrast in the projected image may be converted from intensity to color by using a projected beam of light with a mixture of different frequencies and adjusting the polarizing and phase plate elements to extinguish partially or completely light of a particular frequency. The image matrix comprises an exposed and developed film having a non-birefringent substrate and a superposed partially birefringent composition containing metallic silver and oriented fatty acid silver salt crystals.

27 Claims, 1 Drawing Figure

PATENTED APR 3 1973

3,724,938

INVENTOR.
DANIEL A. NEPELA

BY *Fraser and Bogucki*
ATTORNEYS

VARIABLE CONTRAST IMAGE PROJECTION

BACKGROUND OF THE INVENTION

It has long been considered desirable for photographic and other purposes to be able to vary the contrast of an original optical image, particularly for purposes of converting negative images to positive. Previous methods have employed complicated chemical procedures in treatment of an original exposure to provide a copy having a different contrast from the original. Such methods do not permit selection of effects by visual examination, and are inherently time consuming and expensive in their use of trial and error procedures. A system for controlling contrast has utility in a variety of contexts, including cinematic, television, and scientific instrumentation, as well as photographic. A system for efficiently and quickly controlling contrast through a wide range has application to and utility in a large number of fields including cinematography, television, scientific instrumentation, and photography generally.

SUMMARY OF THE INVENTION

The objectives and purposes of the present invention are realized by a system comprising polarizing elements and an image matrix, which matrix contains three dimensional volume image elements of differing degrees of birefringence arrayed to form an original image defined by a pattern of differing degrees of light absorptive capacity of light or other polarizable electromagnetic wave energy, related to the degree of birefringence. In a specific example of a system in accordance with the invention, the matrix comprises a developed photographic film whose image forming composition is such that the portions subjected to varying degrees of light exposure and subsequently developed have the property of birefringence to varying degrees depending on degree of exposure. Unexposed portions of the developed film exhibit a uniform degree of birefringence substantially larger than that of the exposed film portions, and are substantially lighter, i.e., less light absorptive than the exposed portions. Polarizer, analyzer and phase plate means are placed with respect to the image matrix to provide a path for a projected beam of light. The respective components of the system are aligned in series so that when light is passed through the system an image of desired contrast results on a screen or other reflective surface. The polarizer, phase plate and analyzer are adjustable to provide a projected image of variable contrast by at least partially extinguishing—through birefringence-related destructive interference—light passing to the projected image from the unexposed, less light absorptive, more birefringent matrix portions while leaving substantially unaffected light passing to the projected image from the exposed, relatively highly light absorptive, less birefringent matrix portions. Thus, in the projected image, the intensity of light passing thereto from the unexposed portions is diminished, whereas light passing from the exposed portions is substantially unaffected; consequently, the relation of light and dark and thus the contrast in the projected image varies from that of the original image. In normal operation light is passed successively through the polarizer, film, phase plate, and analyzer. The unique properties of the matrix, specifically realized in the composition of the film, allow for any desired variation of contrast of an image projected on the screw responsive to adjustment of the remaining components.

DETAILED DESCRIPTION OF THE INVENTION

Figure 1:
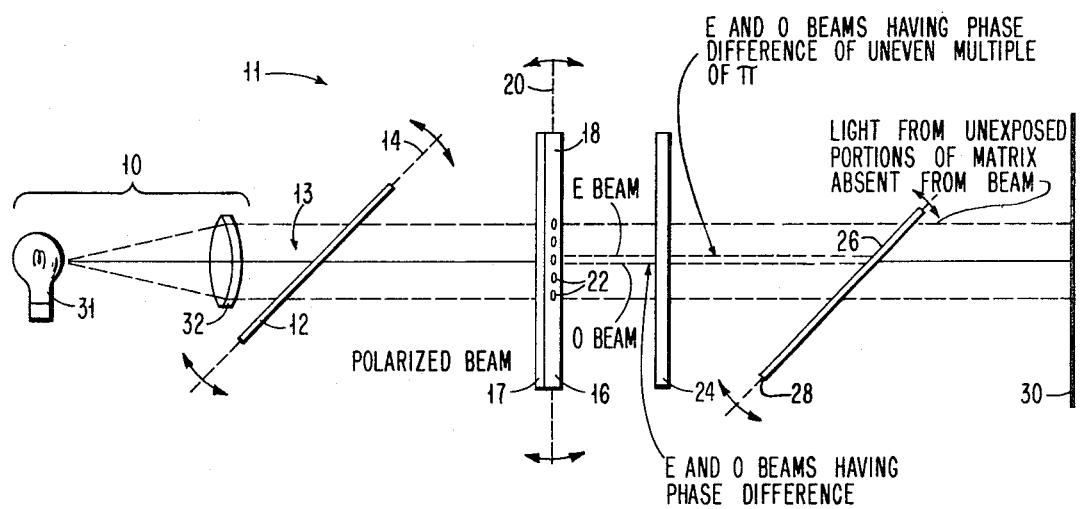
FIG. 1 is a schematic view of a system in accordance with the invention.

As shown in FIG. 1 a source 10, such as a lamp 31 and a collimating lens 32 or a laser (not shown) emits collimated light or other collimated polarizable electromagnetic energy of selected frequency or frequency range directed through a system 11 comprising an optical or projection path of electromagnetically or optically coupled components in accordance with the invention. A collimated beam 13, here assumed to be monochromatic light, is directed along the optical path through a polarizer 12 with an azimuth of transmittance of the electric vector 14. The polarizer 12 transmits light with a plane of polarization in its azimuth of transmittance of the electric vector 14. The beam passes from the polarizer 12 to an image matrix 16 which includes volume or three-dimensional image elements 18, whose fast or optic axis 20 is oriented at a selected angle to the azimuth of transmittance of the electric vector 14 of the polarizer 12.

The image matrix 16 comprises a pattern of birefringent volume elements 18 disposed in image relationship with elements 22 which are substantially less birefringent than the elements 18 and may be substantially isotropic or non-birefringent. The elements 18, 22 define an original image pattern of light and dark, respectively, through their differing light absorptive capacities, which capacities are related to degree of birefringence.

The orientation of the azimuth of transmittance of the electric vector of the polarizer 12 is adjustable to provide selective, variable, birefringence—related extinction through destructive interference—of light passing through the system. For example, when a reversal of image sense is desired, light passing from the volume elements 18 of the image matrix 16 must be extinguished substantially completely, and absent from a projected image. The polarizer 12 is placed with its azimuth of transmittance of the electric vector 14 at an angle of 45° with the fast axis 20 of the volume elements 18 of the image matrix 16. In this manner, light passing through the elements 18 of the image matrix 16 may be phase cancelled and substantially extinguished through destructive interference in the system before forming a projected image, when other components of the system 11 are suitably adjusted as described below. Therefore, for a given intensity of the beam 13, the relation of light and dark, and thus the contrast, in the projected image differs from that in the original image since the background dark level defined by the light passing from elements 22 of the matrix 16 is unchanged for the projected image while the less light absorptive elements 18, which appear light in the original image, appear entirely black in the projected image. A detailed description of an example of an image matrix in accordance with the invention, given below, will aid in understanding the invention.

A specific image matrix 16 in accordance with the invention consists of a developed photographic transparency comprising a non-birefringent substrate 17 and an image reproducing, partially birefringent composition containing metallic silver and oriented fatty acid silver salt crystals.

In preparing the transparency, an image reproducing photolytic composition is placed on a non-birefringent support or substrate. Suitable materials include glass, polycarbonates, polyimides and other transparent materials capable of withstanding development temperatures in the range 80°–140° C.

The photolytic image-reproducing composition placed upon the substrate comprises a mixture of silver fatty acid salt crystals, silver halides, a development agent and a polymeric binder the latter also being essentially non-birefringent. The silver fatty acid salts are generally those of carboxylic acids having between 8 and about 22 carbon atoms and preferably the even numbered fatty acids in view of their relative symmetry as compared to the uneven numbered acids. Examples of suitable fatty acids include lauric, myristic, palmitic, stearic, arachidic and behenic acids. The silver fatty acid salts are present in the form of single crystals more specifically in the form of rods, needles or fibers having an axial ratio of between about 1:5 and about 1:25 with individual crystal radii ranging between about $0.0185\mu$ and about $0.06\mu$. It is to be noted that these silver fatty acid salts are regarded as generally insensitive to light as compared to the photolytic silver halides. The salts are evenly distributed throughout the composition and are coated onto the substrate within the photolytic composition so that they are largely unidirectionally oriented as will be described further hereinafter.

Silver halides comprise silver chloride, silver bromide or silver iodide and mixtures of two or more of these photolytic materials. These silver halides are evenly or homogeneously distributed throughout the composition and are thus in close proximity to the fatty acid silver salts. Although these silver halides are present in a minor amount within the composition as compared to the silver fatty acid salts, the even distribution and concomitant proximity of these materials to the fatty acid salts is important since they provide an excess of silver ions from which the metallic silver image is formed. When exposed to light the silver atoms thus formed act as a catalyst in the reduction of fatty acid silver salt cation to metallic silver.

It is also generally preferred to incorporate or add a reducing agent or developer which assists in the catalytic reduction of silver ions on the photolytic silver formed during light exposure. A large number of such reducing agents are well known to those skilled in the art and are limited to those most favorable with respect to the catalyzed and relative to the uncatalyzed reaction. Of the known developing agents the most important is hydroquinone and hydroquinone derivatives used alone or in combination with substituted aromatic hydroxylamines or aromatic diamines and specifically para-aminophenol derivatives such as methyl-para-aminophenol sulfate and 1-phenol-3 pyrazolidone. Other developing agents may also be used such as 2, 2'-methylene bis-6-t-butyl-p-cresol either in conjunction with each other or as individual developing agents, the combination of two being preferable, as is well known in the prior art. Those described herein are by way of example only.

The silver fatty acid salt crystals, silver halides and developing agents are distributed evenly and homogeneously throughout a polymeric binder composed of a material which is preferably essentially non-birefringent. Suitable binders include cellulose acetate and triacetate, polyvinylacetyls, condensates of polyvinyl-alcohol and lower aldehydes, such as polyvinylformal, polyvinylbutyral and the like. In placing the image reproducing composition comprising the above-described ingredients on the substrate the components are homogeneously dispersed throughout the polymeric binder which composition is thereafter coated on the substrate in such a manner that the rod shaped silver fatty acid salt crystals are largely unidirectionally oriented. This may be accomplished by any suitable method such as extrusion of the viscous polymer binder mixture onto the substrate or by stretching a film of the binder composition until the fatty acid salt crystals are sufficiently oriented and subsequently laminating the film to be substrate. By the term "largely unidirectionally oriented" as used herein it is intended to describe a photographic transparency in which at least about 30 percent of the fatty acid silver salt crystals, in the shape of rods, needles or fibers, are unidirectionally oriented, that is, parallel to one another. It is preferable that at least about 50 percent of the crystals are so oriented but it should be appreciated that less orientation, although not critical, will affect the efficiency of the transparency for the desired result. It will also be appreciated that where the composition has been placed on the substrate so as to orient at least about 30 percent of the crystals parallel with respect to one another although the remaining crystals may not be exactly parallel, their orientation will be generally in the direction of the parallel crystals.

The resulting material is exposed to an object for which an image is desired. Exposure times will vary depending on the extent of development and exposure desired, well appreciated by those skilled in the art. Light exposure creates the photolytic silver metal latent image which thereby acts to catalyze the reduction of the silver ions of the fatty acid salts. Thereafter, the composition is developed by heating the exposed material to a temperature in the range of between about 90° and about 120° C. for a short period of time for example 5–20 sec. The heat activates the oxidation-reduction reaction between the silver ions and developing agents which reaction is further catalyzed by the latent image photolytic silver.

The image matrix prepared as described comprises a heat developable photographic film which forms a latent (non-visible) image upon exposure to light. Subsequent heat development of this image results in a metallic silver image, the optical density — i.e., opacity or light absorptive capacity — of which is a function of the degree of light exposure decreasing with increasing exposure. The birefringence of the developed film also depends on degree of light exposure. Thus, in the developed film optical density and birefringence of each portion are related, unexposed portions being substantially more birefringent than exposed portions, birefringence varying with exposure. The matrix elements 18, comprising unexposed portions, and the elements 22, comprising exposed portions, of the matrix 16 thus differ substantially in birefringence. During its passage through the image matrix 16, the light beam 13 splits into two essentially coincident beams, the O beam, and the E beam, which vibrate parallel to and perpendicular to the fast axis, respectively. The index of refraction of a birefringent material differs for O and E beams and is a measure of the birefringence of the material. For this reason, a phase difference or a differential retardation is introduced between such beams of light during their passage through a birefringent material. Therefore, the difference in birefringence between the unexposed elements 18 and the exposed elements 22 is reflected in a difference in the differential retardation of E and O beams traversing the respective elements. For the unexposed portions 18 the differential retardation is given by the equation $$r_o = (N_{11} - N_1) d/n$$

corresponding to a phase difference of $$2\pi d/r (N_{11} - N_1).$$

The differential retardation for the exposed elements depends on the degree of exposure and is given by the equation $$r_t = r_o - kD.$$

In these equations, $r_o$ is defined as the differential retardation for the unexposed portions 18 between light beams vibrating parallel to the optic axis and light beams vibrating perpendicular to the optic axis; $N_{11}$ is defined as the index of refraction for light beams vibrating parallel to the optic axis for the unexposed portions; $N_1$ is defined as the index of refraction for light beams vibrating perpendicular to the optic axis for the unexposed portions; $d$ is defined as the distance traveled by the light through the matrix 16; $r$ is defined as the wavelength of the light; $r_t$ is defined as the differential retardation for the exposed portions; $k$ is defined as a constant specific to the material; and $D$ is defined as optical density or opacity. Since as described above, the birefringence of the exposed portions of the matrix 16 differs substantially from that of the unexposed areas, the differential retardations of the respective types of elements also differ substantially, and $r_t$ is substantially less than $r_o$.

After emerging from the image matrix 16, the light beam 13 passes to a phase varying means shown as a variable phase plate 24. The phase plate 24 is adjustable in a conventional manner to vary contrast in the projected image. To accomplish this, the variable phase plate 24 is adjusted for introducing an appropriate differential retardation between the E and O beams emerging from unexposed elements 18 of the image matrix 16.

The variable phase plate 24 need not be separated from the image matrix 16; it may comprise, for example, a layer of birefringent material of a suitable thickness superimposed upon the image matrix 16. As an alternative, the phase plate itself may be eliminated by either pre- or post-fogging the imagine matrix. The fogging is accomplished by uniformly exposing the image-reproducing composition to light either prior or subsequent to its exposure to an image. Thereafter, when the composition is developed, it will have an inherent retardance due to the formation of uniformly disposed birefringent non-image elements thereby avoiding the necessity of external phase plate retardance in the system. Specific fogging techniques will be appreciated by those skilled in the art.

In the specific example given above wherein the sense of the original image defined by the image matrix 16 is to be reversed in converting a negative to a positive, light which has passed through the unexposed volume elements 18 of the image matrix 16 must be substantially extinguished and absent from the projected image. In this situation, the variable phase plate 24 is adjusted so that the E and O beams traversing it and the unexposed portions of the film are further differentially retarded in phase to an uneven integral multiple of $\pi$ (180°)—such as $3\pi$, $5\pi$—and the azimuth of transmittance 28 of an analyzer 26 is adjusted to be parallel to that of the polarizer 12, as shown below. The variable phase plate 24 and the analyzer 26 thus comprise destructive interference means for light passing from the matrix elements 18.

The analyzer 26 is disposed in the optical or projection path provided by the system to receive the beam 13 after passage of the beam 13 through the phase plate 24. The analyzer 26 transmits and absorbs incident light in proportions controlled by the relation of its azimuth of transmittance of the electric vector 28 to the plate of light incident thereupon. Thus, the analyzer 26 is adaptable to controlling the contrast of an image formed beyond it in the optical path. Accordingly, where a reversal of image sense is required, light passing through the elements 18 comprising more birefringent unexposed portions of the image matrix 16 is extinguished in a projected image where the analyzer azimuth of transmittance of the electric vector 28 is at an angle of 360° or paralel to the azimuth of transmittance of the electric vector 14 of the polarizer 12 which is set at an angle of 45° to the fast axis 20 of the elements 18. Under this orientation, the E and O beams' components along the azimuth of transmittance of the electric vector 28 of the analyzer 26 are the only components of the light transmitted through the variable phase plate 24. These components are equal and out of phase with each other by an uneven multiple of $\pi$; consequently, they destructively interfere, thereby effectively extinguishing the light which has passed through the volume elements 18 of the image matrix 16, whereas light from the elements 22 is relatively unaffected. Thus, through systems in accordance with the invention original images defined by patterns of differing light absorptive capacity, i.e., contrast, may be converted in a projected image to differing patterns through the relationship between light absorptive capacity and birefringence in the original image matrix. Selectively variable intermediate contrasts in the projected image may be effected by selective variation of the retardation in the variable phase plate 24 whereby varying degrees of partial extinction of light passing from the matrix elements 18 are achieved. Such intermediate contrasts and partial extinction may also be effected in conjunction with selective variation of the relatively orientations of the fast axis 20 and the azimuth of transmittance 14, 28.

In a specific system in accordance with the invention, light of a range of frequencies may be used for the projected beam 13. The beam has a defined color comprised of a mixture of the colors of the different frequencies of light in the beam. After passage through the phase plate 24 and the analyzer 26, light of the frequency extinguished by the film, the phase plate, and the analyzer will be absent from the beam. In a projected image, the resulting light in that portion of the beam from which light of the given frequency was removed will be of a different color from the light in the rest of the beam, in which light of the frequency involved is still present. Differences in birefringence and light absorptive capacity in the image matrix 16 are thus converted in a projected image into the same pattern of differing colors, and color contrast instead of intensity contrast is achieved.

Light leaving the analyzer 26 passes to a projection surface 30 for receiving a projected image. It may be seen that by using this system, contrast of the projected image on the surface 30 may be varied by adjustment of any of the polarizing or phase plate elements.

Although a number of examples of systems and methods in accordance with the invention have been described, it will be appreciated that the invention is not limited thereto but encompasses all variations and modifications falling within the scope of the appended claims.

What is claimed is:

1. A system for projecting images of selectively variable contrast from an original image comprising:
    an image matrix having volume elements defining said original image, said original image being defined by a pattern of absorptive capacities of said matrix volume elements with respect to said light, said volume elements having birefringence related to said absorptive capacities and having a fast axis whose orientation is selectively variable;
    variable phase varying means for receiving light from said image matrix and for selectively varying the phase of said light; and
    an analyzer for receiving light from said image matrix, said analyzer having an azimuth of transmittance of the electric vector whose orientation is selectively variable, said phase varying means and said analyzer being alignable with said matrix to define a path for said light, said path comprising said matrix, said phase varying means and said analyzer.

2. The system of claim 1 wherein said optic axis and said azimuth of transmittance of the electric vector of said analyzer are orientable at selectively variable angles with respect to the plane of polarization of said polarized light, and wherein said phase varying means is adjustable for at least partially extinguishing polarized light passing thereto from selected said matrix volume elements, depending on the birefringence of said selected matrix volume elements.

3. The system of claim 2 wherein said phase varying means comprises a layer of birefringent material disposed on the surface of said matrix.

4. The system of claim 2 wherein a portion of said matrix volume elements have a substantially equal birefringence and the remainder of said matrix volume elements have varying birefringence, the birefringence of said other matrix volume elements differing substantially from the birefringence of said matrix volume elements having substantially equal birefringence and wherein said azimuth of transmittance of the electric vector of said analyzer and said optic axis are orientable at selectively variable angles with respect to the plane of polarization of said polarized light, and wherein said phase varying means is adjustable for at least partially extinguishing polarized light passing thereto from said substantially equally birefringent matrix volume elements.

5. The system of claim 4 wherein said matrix comprises an exposed and developed photographic film and wherein said birefringence of said matrix volume elements varies with exposure of said matrix volume elements, said elements having substantially equal birefringence being substantially unexposed and said other matrix volume elements having substantially varying birefringence being exposed.

6. The system of claim 5 wherein said azimuth of transmittance of the electric vector of said analyzer is oriented substantially paralel to said plane of polarization of said polarized light, and said optic axis of said matrix volume elements is oriented at an angle of substantially 45° to said plane of polarization of said polarized light and wherein said phase varying means is adjusted to introduce a phase difference of substantially an uneven integral multiple of 180° between E and O light beams passing thereto from said substantially unexposed volume elements.

7. The system of claim 6 wherein said unexposed matrix volume elements are substantially isotropic.

8. The system of claim 2 wherein said matrix comprises an exposed photographic film developable so that upon development birefringence of said matrix volume elements varies with exposure.

9. The system of claim 1 wherein said polarized light comprises a range of wavelengths.

10. A system for selectively varying light contrast in an image projected from an original image along an optical path comprising:
    an image matrix in the optical path including volume elements having birefringence defining said original image through a pattern of light absorptive capacities, the birefringence of said volume elements varying with the light absorptive capacity, said matrix comprising: fatty acid crystals and metallic silver isotropic volume elements and birefringent fatty acid silver salt crystals, at least a portion of which acid and salt crystals are unidirectionally oriented;
    analyzer means for disposition in the optical path; and
    phase varying means for disposition in the optical path.

11. The system of claim 10 wherein said matrix is disposed upon a non-birefringent substrate which comprises a material selected from the group consisting of glass, cellulose esters, polycarbonates and polystyrene.

12. The system of claim 10 wherein said fatty acids comprise carboxylic acids having between about 9 and 22 carbon atoms.

13. The system of claim 10 wherein at least about 30 percent of said fatty acids and fatty acid silver salts are unidirectionally oriented.

14. The system of claim 10 wherein said fatty acid, fatty acid salts and metallic silver are present within an essentially non-birefringent binder.

15. A system for projecting along a projection path an image of selectively variable contrast to that of an original image comprising:
an image matrix for disposition along said projection path and including volume elements, said volume elements defining said original image by their absorptive capacities with respect to electromagnetic wave energy passing through said volume elements, said elements being birefringent to a varying degree with varying electromagnetic wave energy absorptive capacity, and having a fast axis; and
destructive interference means for disposition along said projection path and for at least partially extinguishing electromagnetic wave energy passing through at least a portion of said image matrix elements.

16. The invention as set forth in claim 15 wherein said image matrix includes volume elements of substantially differing birefringence.

17. The invention as set forth in claim 15 wherein said image matrix includes volume elements having substantially equal birefringence.

18. The invention as set forth in claim 17 wherein said matrix volume elements having substantially equal birefringence have substantially different birefringence from other said volume elements.

19. The invention as set forth in claim 18 wherein said matrix volume elements having substantially equal birefringence have a substantially higher birefringence than said other said matrix volume elements.

20. The invention as set forth in claim 19 wherein said destructive interference means comprises a variable phase plate and an analyzer, said variable phase plate and said analyzer being successively disposed along said projection path following said image matrix and further including a light source and a polarizer, said light source being positioned to direct monochromatic light through said polarizer, said polarizer being positioned to transmit light from said light source to said image matrix, the azimuth of transmittance of the electric vector of said polarizer and the azimuth of transmittance of the electric vector of said analyzer being disposed substantially parallel, and wherein said variable phase plate is adjustable to vary contrast in said projected image by at least partially extinguishing light passing thereto from said matrix volume elements having substantially higher birefringence.

21. The invention as set forth in claim 20 wherein said light source directs polychromatic light through said polarizer and wherein said variable phase plate is adjustable to vary contrast in said projected image by at least partially extinguishing light of at least one wavelength included in said beam and passing to said variable phase plate from said matrix volume elements having said substantially higher birefringence.

22. A method for projecting an image of variable contrast from an original image comprising the steps of:
a. passing light polarized in a determined plane through an image matrix having elements defining said original image, said elements being birefringent and light absorptive in related degrees and having an optic axis;
b. passing the light from said matrix successively through a variable phase plate and an analyzer; and
c. selectively adjusting said variable phase plate and selectively varying the orientation of the azimuth of transmittance of the electric vector of said analyzer for at least partially extinguishing in said analyzer light passing thereto from said image matrix.

23. The method as set forth in claim 22 wherein the orientations of said optic axis and said azimuth of transmittance of the electric vector of said analyzer are selectively varied with respect to said plane of polarization of said light and said variable phase plate is adjusted, for at least partially extinguishing in said analyzer light passing thereto from said matrix elements having the highest degree of birefringence.

24. The method as set forth in claim 23 wherein the azimuth of transmittance of the electric vector of said analyzer is oriented substantially at a 45° angle with the optic axis of said image matrix element and is oriented substantially parallel to said plane of polarization of said light.

25. The method as set forth in claim 24 wherein said variable phase plate is adjusted for differentially retarding to an uneven integral multiple of 180° the phase of E and O beams in light passing thereto from said image matrix elements having the highest degree of birefringence.

26. A method for converting an original image defined by differing light absorptive capacities of image elements of a transparency into a projected image defined by differing colors, said image elements having birefringence related to their light absorptive capacities, comprising:
a. passing polarized polychromatic light through said transparency;
b. passing the light successively through a variable phase plate and an analyzer which are adjusted for at least partially extinguishing a selected wavelength of light within said polarized light and passing thereto from image elements of said transparency having a selected degree of birefringence.

27. In a system for projection of an image from an original image wherein light is transmitted through said image to a receiving surface, the improvement comprising the combination:
a. a transparency comprising image elements having varying degrees of light absorptive capacity, whereby said original image is defined, and varying degrees of birefringence, said degrees of birefringence and said degrees of light absorptive capacity being related;
b. a variable phase plate disposed between said matrix and said projected image; and
c. an analyzer disposed between the variable phase plate and the projected image;
whereby the contrast of said projected image may be selectively varied by adjusting the orientation of the azimuth of transmittance of the electric vector of said analyzer and adjusting said variable phase plate for variable extinction in said analyzer of light passing thereto from said transparency.

* * * * *